United States Patent [19]
Fukunaga et al.

[11] Patent Number: 5,566,801
[45] Date of Patent: Oct. 22, 1996

[54] TORQUE CONVERTER HAVING A RETARDER MECHANISM THEREIN

[75] Inventors: Takao Fukunaga, Yawata; Shigeru Takeshita, Neyagawa, both of Japan

[73] Assignee: Kabushiki Kaisha Daikin Seisakusho, Osaka, Japan

[21] Appl. No.: 400,222

[22] Filed: Mar. 7, 1995

[30] Foreign Application Priority Data

Mar. 10, 1994 [JP] Japan ................................ 6-039614

[51] Int. Cl.⁶ ............................. F16H 45/02; F16H 45/00
[52] U.S. Cl. ..................... 192/3.23; 192/3.29; 192/12 A
[58] Field of Search ..................... 192/3.34, 3.24, 192/3.23, 4 B, 12 A, 3.29; 60/341, 345

[56] References Cited

U.S. PATENT DOCUMENTS

| | | | |
|---|---|---|---|
| 3,152,446 | 10/1964 | Foerster et al. | 60/345 X |
| 3,259,218 | 7/1966 | Black et al. | 192/3.29 |
| 3,524,523 | 8/1970 | Klimex et al. | 192/3.23 X |
| 3,526,304 | 9/1970 | Pearce et al. | 192/3.23 |
| 3,659,687 | 5/1972 | Edmunds | 192/3.34 X |

FOREIGN PATENT DOCUMENTS

| | | | |
|---|---|---|---|
| 426816 | 3/1926 | Germany | 192/12 A |
| 3150785 | 11/1983 | Germany . | |
| 3-239850 | 10/1991 | Japan | 192/3.29 |
| 160635 | 4/1964 | U.S.S.R. | 192/3.34 |
| 577339 | 10/1977 | U.S.S.R. | 60/341 |
| 2112117 | 7/1983 | United Kingdom . | |

*Primary Examiner*—Rodney H. Bonck
*Attorney, Agent, or Firm*—Shinjyu Office of Patent Attorneys

[57] ABSTRACT

A torque converter (1) including a front cover (2), a torque converter main body housing (3) and a retarder (5). The front cover (2) is coupleable to a crankshaft of an engine. The torque converter main body housing (3) is coupled to the front cover (2) forming a hydraulic fluid chamber (A). The torque converter (1) outputs torque transmitted from the front cover (2) to the main drive shaft (34). The retarder (5) is arranged inside the hydraulic fluid chamber (A) and uses the fluid to dampen torque transmitted from the torque converter main body housing (3) to the main drive shaft (34).

5 Claims, 3 Drawing Sheets

5,566,801

TORQUE CONVERTER HAVING A RETARDER MECHANISM THEREIN

BACKGROUND OF THE INVENTION

1. Field of the Invention

The present invention relates to a torque converter, and more particularly a torque converter which includes a retarder mechanism within the housing of the torque converter.

2. Description of the Related Art

A typical torque converter has three types of vane elements, an impeller, a turbine and a stator, all disposed inside a hydraulic fluid chamber formed within a torque converter housing. Such a torque converter uses hydraulic fluid to transmit torque from an input rotor connected to the impeller to an input shaft of a transmission connected to the turbine. Part of the torque converter housing defines an impeller shell which includes the impeller, and partially defines the hydraulic fluid chamber, which is filled with hydraulic fluid. The turbine is arranged opposite the impeller inside the hydraulic fluid chamber and is coupled to the input shaft. Moreover, when torque is input from the input rotor to the torque converter housing, the turbine is made to rotate by fluid flowing from the impeller toward turbine. The torque is subsequently transmitted to the output shaft.

In an industrial vehicle equipped with such a torque converter, a fluid type retarder is, for example, mounted to a portion of the transmission where fluid retards the rotation of the input shaft of the transmission. This type of retarder is mainly contained inside a hydraulic fluid chamber in the transmission and formed from a pair of opposing impellers. Each impeller is arranged with a plurality of impellers extending outward. The impellers of the retarder are rotating impellers that are fixed to the rotating shaft and a fixed impeller that is fixed to the housing so it cannot rotate. When hydraulic fluid is sent into this hydraulic fluid chamber, the fluid that flows from the rotating impeller moves toward the outside due to centrifugal force while the fluid flows in a rotational direction. When this occurs, the hydraulic fluid strikes the impeller material of the fixed impeller, flows in the reverse direction of the rotating impeller and return to the rotating impeller side. This hydraulic fluid flow returning from the fixed impeller disturbs the rotation of the rotating impeller. As a result, the rotating shaft is braked.

Because the torque conveyer and retarder of the prior art stated above are both installed in a vehicle separately, they both require space in which to install them.

SUMMARY OF THE INVENTION

The purpose of this invention is to reduce the space occupied by the above devices.

In one aspect of the present invention, a torque converter includes a front cover coupleable to a driveshaft of an engine, a torque converter main body housing connected to the front cover defining a fluid filled space therebetween, a turbine disposed in the fluid filled space, and a retarder arranged inside the fluid filled space which uses the fluid in the fluid filled space to retard torque in response to torque transferred from the torque conveyer main body housing to the turbine, a portion of the retarder connected to the turbine.

In another aspect of the invention, the retarder is arranged between the inner periphery of the front cover and inner periphery of the torque converter main body housing.

In another aspect of the invention, the torque converter main body housing includes an impeller fixed thereon and the retarder is disposed radially inward of the turbine and the impeller.

In another aspect of the invention, the torque converter further includes a stator disposed adjacent to the turbine, a bearing having an inner race and an outer race disposed within a central portion of the stator, wherein the retarder includes a first impeller rigidly connected to the turbine and a second impeller disposed adjacent to the first impeller, and the second impeller is restricted from rotational movement with respect to the inner race of the stator.

In another aspect of the invention, a one-way clutch is disposed between the inner race, and the outer race.

In another aspect of the invention, the torque converter includes a fluid path formed in at least one of the first impeller and the second impeller for the purpose of supplying fluid between the first impeller and the second impeller.

OPERATION

In a torque converter related to this invention, when torque is transmitted from the input rotor to the front cover, that torque is output from the torque converter main body homing to the output shaft. When the retarder operates, the torque is retarded.

In this torque converter, the retarder is arranged inside the fluid space of the torque converter. Therefore, the space for the retarder installed on the outside of a conventional torque converter can be reduced.

When the rotating impeller of the retarder couples the torque converter main body housing and the transmission shaft together, the number of other parts can be reduced by the rotating impeller of the retarder functioning as conventional parts. As a result, the space is reduced.

When the retarder is arranged between the turbine and the output shaft, the position of the retarder has more space compared to a conventional retarder. Because of this, the retarder does not increase the size of the torque converter. As a result, the space occupied by the retarder is reduced.

When the fixed impeller of the retarder is fixed to the stator support construction so it cannot rotate, the operation becomes even more effective.

When the fluid chamber is formed by joining the rotating impeller and the fixed impeller together, it is not necessary to form the fluid chamber using other material which allows the space occupied to be reduced and further lowers the cost.

When the rotating impeller has an inner peripheral wall and an outer peripheral wall supported to freely move around the fixed impeller, the space in the shaft direction for the retarder can be reduced by overlapping the rotating impeller and the fixed impeller in the shaft direction.

When a fluid path is formed in at least one of the rotating impeller and the fixed impeller, said operation becomes even more effective.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENTS

Figure 1:
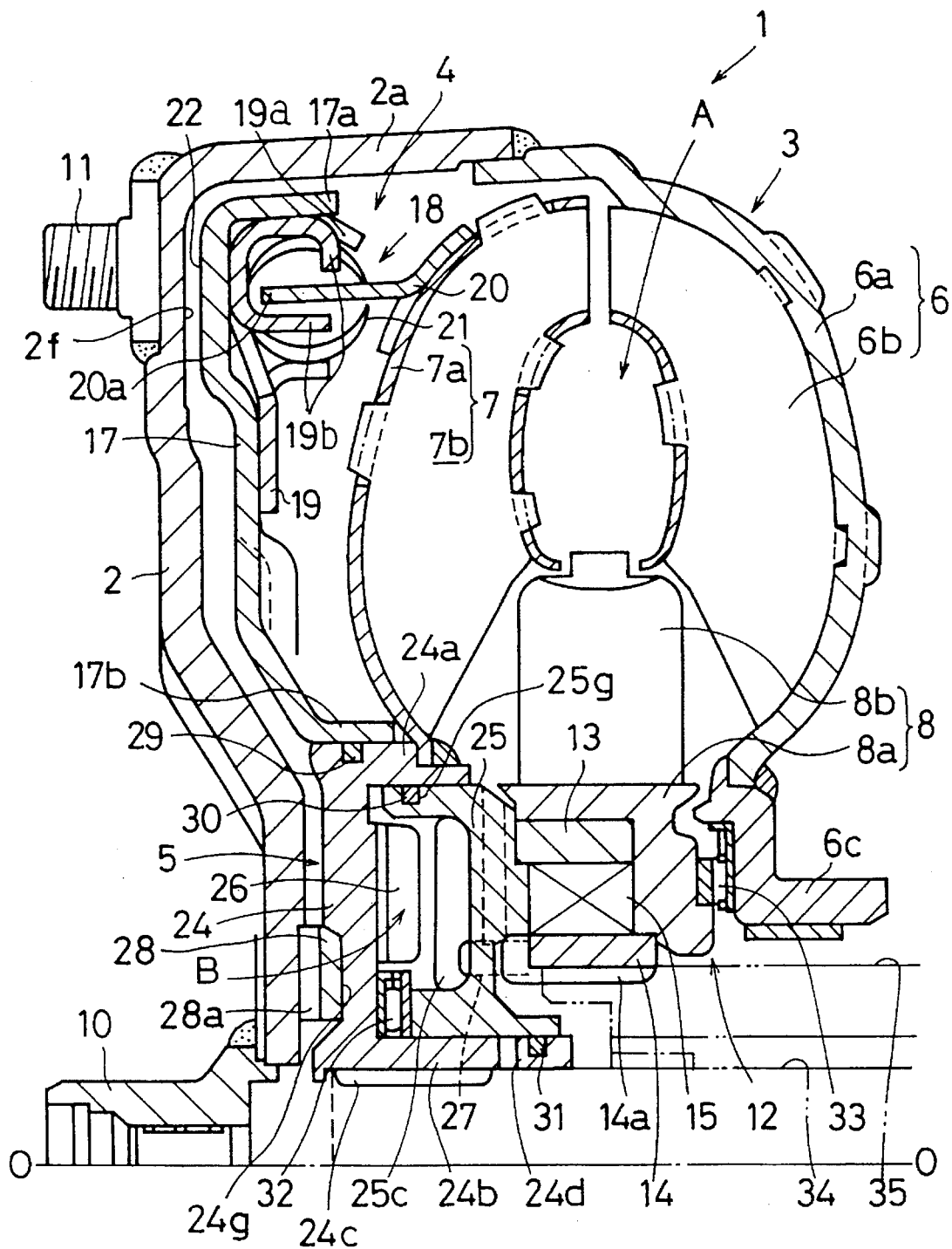
FIG. 1 is a fragmentary section of a torque converter in accordance with one embodiment of the present invention.

FIG. 1 shows the torque converter (1) according to one preferred embodiment of this invention. In this figure, 0—0 represents the rotating shaft axis of the torque converter (1). An engine (not shown in figure) is disposed to the left side and a transmission (not shown in figure) is disposed on the right side of the figure.

The torque converter (1) is a device that transmits torque from a crankshaft (not shown in figure) on the engine to an input shaft (34) of the transmission (shown in phantom in FIG. 1). In the torque converter (1), a hydraulic fluid chamber (A) is formed by a disc-shaped front cover (2) and torque converter main body housing (3). The torque converter main body housing (3) is partially defined by an impeller shell (6a) that is welded to an outer peripheral rim (2a) of the front cover (2). Hydraulic fluid fills the interior of the hydraulic fluid chamber (A).

The inner peripheral edge of the impeller shell (6a) is welded to the impeller hub (6c). Further, a plurality of bolts (11) are welded on the inner peripheral engine side of the front cover (2). A drive plate (not shown in figure) coupleable to the crankshaft on the engine is easily fixed via the bolts (11) to the torque converter (1). A hub (10) is welded to the inner peripheral portion of the front cover (2).

Disposed inside the hydraulic chamber (A) are the following: the impeller (6b), a turbine (7) and a stator (8), a lockup device (4) and a retarder (5).

Inside the impeller shell (6a) a plurality of impeller blades (6b) are fixed and the impeller (6) is formed by both. At a position opposed to the impeller (6) is a turbine (7). The turbine (7) is formed from a turbine shell (7a) and a plurality of turbine blades (7b) fixed inside the turbine shell (7a). The inner peripheral edge of the turbine shell (7a) is welded to a rotatable impeller (24) (described below) of a retarder (5).

A stator (8) is arranged between the inner periphery of the impeller (6) and the inner periphery of the of the turbine (7). The stator (8) is a device that adjusts the flow direction of hydraulic fluid returning from the turbine (7) to the impeller (6) and is formed by a circular stator carrier (8a) and a plurality of stator blades. (8b) formed on the outer periphery of the stator carrier (8a). The stator carrier (8a) is supported on a stator sleeve (35) which is fixable to a non-rotatable portion transmission housing (not shown) via a one-way clutch mechanism (12). The one-way clutch mechanism (12) includes an outer race (13), an inner race (14) and a one-way clutch (15). The outer race (13) is fixed to the inner side of the stator carrier (8a).

Figure 2:
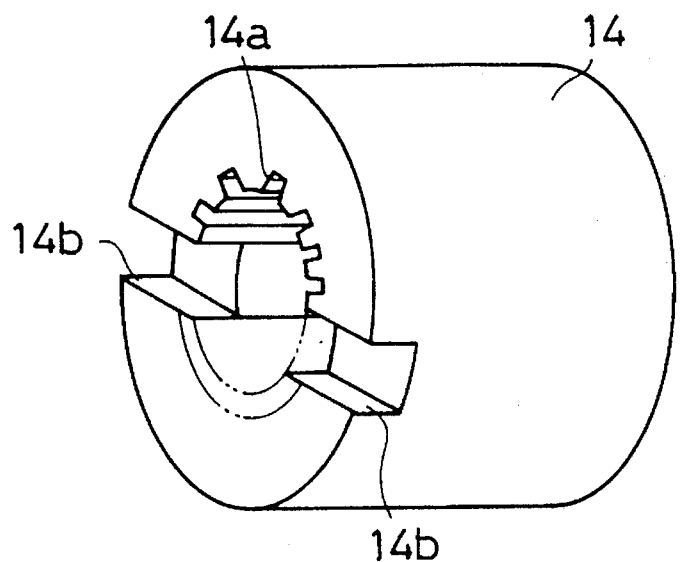
FIG. 2 is a perspective view of a main race element shown removed from the torque converter depicted in FIG. 1.

As shown in the detail of FIG. 2, the inner race (14) has spline holes (14a) to join the race to the spline (not shown in figure) of the stator sleeve (35) so it cannot rotate. Further, in the inner race (14) grooves (14b) are formed at 2 places opposite each other, extending radially outward. The one-way clutch (15) is arranged between the outer race (13) and the inner race (14) and the outer race is supported to only rotate in one direction with respect to the inner race (14) due to the one-way clutch (15).

With reference again to FIG. 1, the lockup device (4) is arranged between the front cover (2) and the turbine (7) and includes a disc-shaped piston (17) and an elastic coupling mechanism (18).

The disc-shaped piston (17) has cylindrical end walls (17a, 17b) each extending toward the impeller shell (6a). The end wall (17b), which is on an inner periphery side of the disc-shaped piston (17), is supported to slide freely along the axis O—O and in the circular direction on an outer radial portion of the rotating impeller (24), as will be explained in greater detail below. On an axial surface of the piston (17) a friction material (22) is attached. Opposite the friction material (22) an inner surface of the front cover (2) is prepared as a friction surface (2f).

The elastic coupling mechanism (18) is arranged on the inner periphery of the outer peripheral end wall (17a) of the piston (17). The elastic coupling mechanism (18) includes by a disc-shaped retaining plate (19), a plurality of torsion springs (21), and a driven plate (20). The retaining plate (19) is fixed to the piston (17) by a rivet (not shown). The retaining plate (19) has a cylinder portion (19a) extending in a circular shape on its outer periphery and at least partially retains the plurality of torsion springs (21) extending in a circular direction inside the cylinder portion (19a). Further, both edges in the circular direction of each torsion spring (21) are supported on a curved claws (19b) formed on the retaining plate (19). The driven plate (20) is a ring shape and is fixed on the rear surface (engine side) of the turbine shell (7a) by spot welding. On the driven plate (20) a plurality of claws (20a) are formed. These claws (20a) join to both edges in the circular direction of the torsion spring (21). In this way, the piston (17) and the turbine shell (7a) are elastically coupled in a circular direction via the elastic coupling mechanism (18).

The retarder (5) is arranged adjacent to the turbine (7) between the inner periphery of the front cover (2) and the one-way clutch mechanism (12). The retarder includes a rotating impeller (24) and a retarder stator (25), hereinafter referred to as a fixed impeller (25). The rotating impeller (24) and fixed impeller (25) are arranged opposite to each other and a fluid chamber (B) is defined between them.

The rotating impeller (24) is a disc-shaped material and has cylindrical walls (24a, 24b) extending toward the transmission on both its inner periphery and the outer periphery. The transmission side of the outer peripheral side cylindrical wall (24a) is welded to the inner peripheral edge of the turbine shell (7a). Furthermore, a disc-shaped channel is formed on the outer peripheral surface of the outer peripheral side cylindrical wall (24a) and inside this channel a seal ring (29) is arranged. The seal ring (29) seals the gap between the inner peripheral side wall (17b) of the piston (17) and the outer periphery of the rotating impeller (24).

On the inner peripheral surface of the inner peripheral side cylindrical wall (24b), a spline (24c) is formed which meshes with the spline teeth of the input shaft (34) of the transmission. Also, adjacent to the inner peripheral side cylindrical wall (24b), a plurality of fluid paths are formed circumferentially, as is explained in greater detail below. On transmission side outer peripheral surface of the inner peripheral side cylindrical wall (24b), a channel is formed extending circumferentially. Inside the channel, a seal ring

(31) is disposed. This seal ring (31) seals the gap between the inner periphery of the fixed impeller (25) (described below) and the inner peripheral side cylindrical wall (24b).

An annular channel (24g) is formed in the impeller (24). An annular ring shaped member 28 is disposed in the channel 24g. The annular ring shaped member 28 serves as a spacer to help the impeller (24) maintain its proper position. The annular ring shaped member 28 is formed with a plurality of radially extending fluid paths 28a, which allow fluid flow in and out of the space between the piston (17) and the inner surface of the front cover (2).

Figure 4:
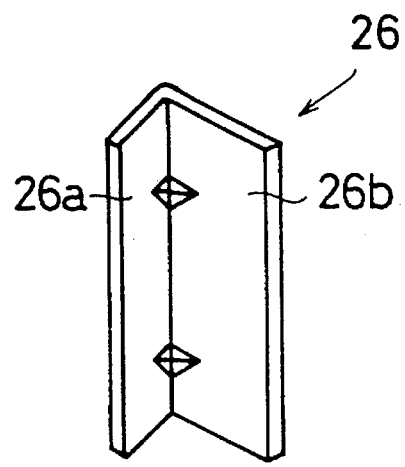
FIG. 4 is a perspective view of a portion of the torque converter, shown removed from the torque converter depicted in FIG. 1.

On the rotating impeller (24) a plurality of impeller members (26) are fixed. As shown in the details of FIG. 4, the impeller members (26) are formed by flange (26a) fixed to the rotating impeller main body and an impeller portion (26b) extending vertically from the flange (26a).

Figure 3:
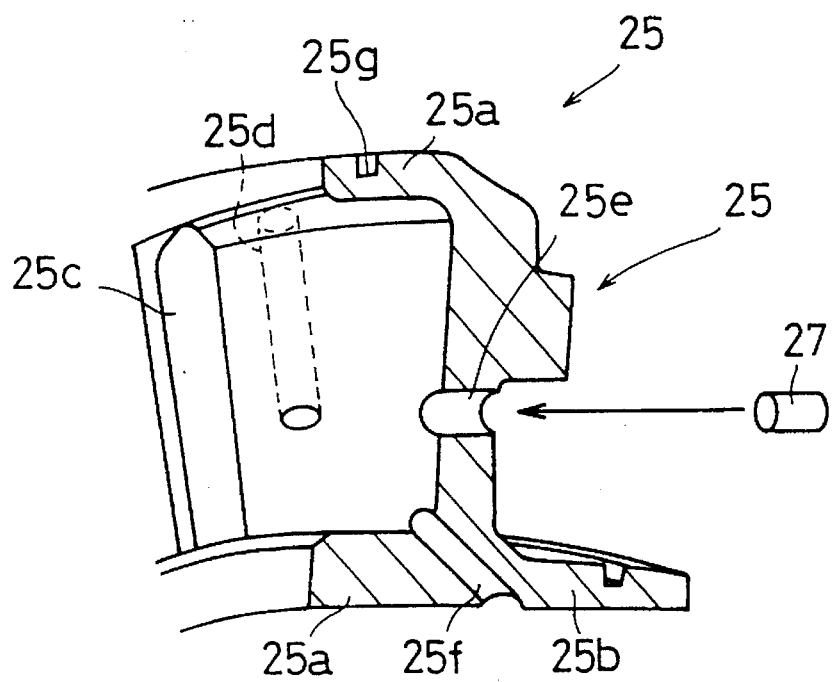
FIG. 3 is a fragmentary, part section, perspective view of an impeller within the torque converter depicted in FIG. 1.

As is shown in greater detail in FIG. 3, the fixed impeller (25) is formed of a disc-shaped material and has two cylindrical walls (25a) extending toward the engine at both its outer periphery and the inner periphery. Moreover, on the inner periphery of the fixed impeller (25), a cylindrical wall (25b) is formed that extends toward the transmission. As is shown in FIG. 1, the outer peripheral side cylindrical walls (25a) can move relative to the inner peripheral surface of the outer peripheral side cylindrical wall (24a) of the rotating impeller (24).

On the outer peripheral surface of the outer peripheral side cylindrical wall (25a), a channel (25g) is formed extending circumferentially. Inside the channel (25g) a seal ring (30) is formed. This seal ring (30) seals the outer periphery of the fluid chamber (B). The inner peripheral surface of the fixed impeller (25) makes contact with the outer peripheral surface of the inner peripheral side cylindrical wall of the fixed impeller (24) so it can move relative to the outer peripheral surface. Between the engine side of the outer peripheral side cylindrical wall (25a) of the fixed impeller (25) and the rotating impeller (24), a bearing (32) is arranged.

In the fixed impeller (25) a plurality of impeller members (25c) extend outward on the cylindrical space of the inner and outer periphery toward to the engine. In the fixed impeller (25) a first fluid path (25d) is formed. The first fluid path (25d) is designed to exhaust hydraulic fluid from between the inner periphery of the turbine (7) and the stator (8) to the inner peripheral side. Moreover, in the fixed impeller (25) a second fluid path (25f) is formed. The second fluid path (25f) is a plurality of formations formed circumferentially and couples the fluid chamber (B) and the fluid path (24d) of the rotating impeller (24). On the fixed impeller (25) a plurality of holes (25e) are further formed circumferentially. The holes (25e) pass through a direction generally parallel to the axis 0—0 and inside each hole (25e) one end of a pin (27) is inserted. The pin (27) is inserted into a notch (14b) of the main race (14) is fixed so it cannot rotate. In this way the fixed impeller (25) joins the main race (14) via two pins (27) so it cannot rotate with respect to the main race (14).

Because the retarder (5) is arranged inside the hydraulic fluid chamber (A) of the torque converter, independent space for a retarder is not necessary. Consequently, the overall space occupied can be reduced.

Furthermore, as explained above, the retarder (5) is arranged between the inner periphery of the front cover (2) and the inner periphery of the torque converter main body housing. Typically the area between the inner periphery of the front cover (2) and the impeller (6) and radially inward of the turbine (7) is filled primarily with hydraulic fluid. In the present invention the retarder (5) is positioned in this area, thus facilitating a more efficient use of space.

The rotating impeller (24) of the retarder couples the turbine (7) and the main drive shaft (34). Therefore, the turbine hub can be made smaller than a conventional one as well as reducing the cost and the space occupied.

Moreover, the fixed impeller (25) of the retarder is joined to the main race (14) so it cannot rotate. Because of this, by using the existing main race (14), the installation of a special fixing construction for the fixed impeller (25) becomes less necessary than a conventional torque converter. This allows the space occupied to be reduced and the cost lowered.

Even further, because the fluid chamber (B) is formed between the rotating impeller (24) and the fixed impeller (25), further retarder (5) parts that would be needed for a conventional retarder hydraulic fluid chamber become unnecessary.

As a result, the space occupied can be reduced and the cost lowered.

Moreover, inside the cylindrical walls (24a, 24b) of the inner and outer periphery of the rotating impeller (24) the fixed impeller (25) is able to be inserted. In this way by arranging the impellers by overlapping them, the distance between both of them in the shaft direction can be reduced. This can also reduce the dimensions in the shaft direction of the retarder (5) inside the torque converter (1).

Next, the operation of the above preferred embodiment will be explained.

The torque from the crankshaft on the engine is input from the drive plate (not shown in figure) to the front cover (2). When this occurs, the torque is transmitted to the impeller shell (6a). By this action, the impeller (6) turns and the hydraulic fluid flows from the impeller (6) to the turbine (7). The flowing of the hydraulic fluid turns the turbine (7) and the torque of the turbine (7) is output in the retarder (5) to the main drive shaft (34) via the rotating impeller (24). Further, the flow of the hydraulic fluid retraining from the turbine (7) to the impeller (6) is adjusted by the stator (8).

When the main drive shaft (34) is set to a constant rotational speed, the fluid pressure in the hydraulic fluid chamber (A) of the torque converter (1) is increased together with draining of the hydraulic fluid between the front cover (2) and the piston (17). As a result, the piston (17) is pushed up against the front cover (2). When this occurs, the friction material (22) of the piston (17) is forced up against the friction surface of the front cover (2). As a result, the torque of the front cover (2) is transmitted via the elastic coupling mechanism (18) from the piston (17) to the turbine (7). In effect, the torque of the front cover (4) is mechanically output to the main drive shaft (34) via the turbine (7). At this time, the energy loss is reduced with an optimum fuel consumption state being obtained.

When an auxiliary brake (not shown in figure) is ON, a hydraulic fluid control mechanism(not shown in figure) supplies hydraulic fluid to the fluid chamber (B) of the retarder (5) through the fluid path (24d, 25f). The hydraulic fluid is moved in the outward direction by the impeller material (16) of the rotating impeller (24) as well as being lead in a rotational direction also. When this occurs, the hydraulic fluid strikes the impeller material (25c) of the fixed impeller (25), flows in a direction reverse to the rotational direction of the rotating impeller (24) and then returns to the rotating impeller (24).

By this action, the rotation of the rotating impeller (24) is impeded and the output torque dampened.

When the auxiliary brake (not shown in figure) is OFF, the hydraulic fluid control mechanism (not shown in figure) expels the hydraulic fluid in the fluid chamber (B). When the hydraulic fluid is expelled from the fluid chamber (B), the rotating impeller (24) returns to the original rotation speed.

Figure 5:
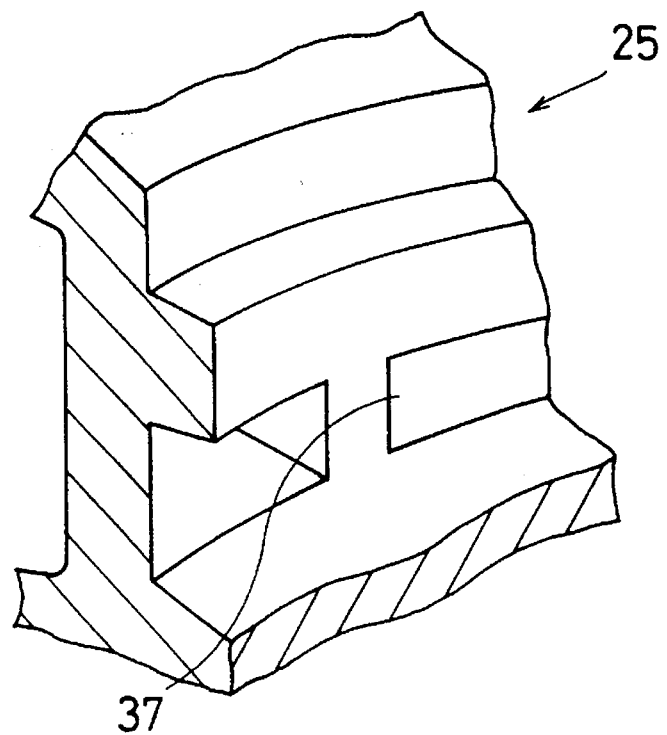
FIG. 5 is a fragmentary, part section, perspective view of a different portion of the impeller of the present invention, in accordance with another embodiment of the present invention.

As a method to join the fixed impeller to the main race so it cannot rotate, a protrusion can be installed to the fixed impeller (25) in place of the pin. The protrusion (37) shown in FIG. 5 is inserted into the inside of the notch (14b) of the main race.

EFFECT OF THE INVENTION

In a torque converter related to this invention, when torque is transmitted from the input rotor to the front cover, that torque is output from the torque converter main body to the output shaft. When the retarder operates, said torque is dampened.

In this torque converter, a retarder is arranged inside the fluid space of the torque converter. Consequently, the space occupied by a retarder installed on the outside of a conventional torque converter can be reduced.

When the retarder is ganged between the inner periphery of the front cover and the inner periphery of the torque converter main body housing, the position of the retarder occupies less space than conventional making the need for a larger torque converter due to the retarder unnecessary. As a result, the space occupied can be reduced. When the rotating impeller of the retarder couples the torque converter main body housing and the output shaft, the rotating impeller of the retarder can operate as conventional parts allowing the number of other parts to be reduced. As a result, the space occupied can be reduced.

When the retarder is arranged between the turbine and the output shaft, the position of the retarder has more space than conventional. Therefore, the need for a larger torque converter due to the retarder is unnecessary. As a result, the space can be reduced.

When the fixed impeller of the retarder is fixed to the stator support construction so it cannot rotate, the effect is more pronounced.

When the rotating impeller and the fixed impeller are joined together to form a fluid chamber, it is not necessary to form the fluid chamber using other material which allows the space to be reduced and further lowers the cost.

When the rotating impeller has an inner peripheral wall and an outer peripheral wall supported to freely move around the fixed impeller, the space in the shaft direction for the retarder can be reduced by overlapping the rotating impeller and the fixed impeller in the shaft direction.

When a fluid path is formed in at least one of the rotating impeller and the fixed impeller, the effect is more pronounced.

EXPLANATION OF MARKS

1 Torque converter
2 Front cover
3 Torque converter main body housing
5 Retarder
6 Impeller
7 Turbine
8 Stator
12 One-way clutch mechanism
13 Outer race
14 Inner race
15 One-way clutch
24 Rotating impeller
25 Fixed impeller
A Hydraulic fluid chamber
B Fluid chamber Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A torque converter comprising:

a front cover attached to a torque converter main body housing, said housing and said front cover defining an annular chamber;

an impeller formed on an inner surface of said housing;

a turbine disposed in said annular chamber concentric with and opposed to said impeller;

a hydraulically actuated retarder disposed in said annular chamber radially inward from and concentric with said impeller and said turbine, said retarder including a rotary impeller connected to said turbine for rotation therewith, said retarder also including a fixed impeller opposed to said rotary impeller, said rotary impeller and said fixed impeller defining a retarder subchamber;

a one way clutch mechanism disposed radially inward from said turbine and said impeller, adjacent to said retarder, said one way clutch mechanism having an inner race and an outer race, said fixed impeller engaged with and connected to said inner race; and a stator impeller mounted to said outer race such that said stator impeller is limited to rotation in one direction only by said one way clutch mechanism about said inner race.

2. The torque converter as in claim 1, wherein:

said inner race comprises an annular sleeve having spline gear teeth formed on an inner circumferential surface and a pair of opposing grooves formed on an axial surface thereof;

said fixed impeller further includes at least one pin extending from said fixed impeller into one of said pair of opposing grooves thus connecting said fixed impeller to said inner race.

3. The torque converter as in claim 1, wherein a fluid path is formed in said fixed impeller for communicating hydraulic fluid with said retarder subchamber.

4. The torque converter as in claim 1, further comprising a lock-up clutch mechanism configured to selectively couple said turbine to said front cover.

5. The torque converter as in claim 4, wherein said lock-up clutch includes a piston supported on said rotary impeller, said piston being moveable in an axial direction for engagement with said front cover in response to fluid pressure within said fluid chamber, said piston elastically coupled to said turbine by at least one coil spring.

* * * * *